United States Patent
Yamagou (10) Patent No.: US 12,404,896 B2
(45) Date of Patent: Sep. 2, 2025

(54) FLUID DYNAMIC BEARING, FLUID DYNAMIC BEARING DEVICE, AND MOTOR

(71) Applicant: NTN Corporation, Osaka (JP)

(72) Inventor: Masashi Yamagou, Mie (JP)

(73) Assignee: NTN CORPORATION, Osaka (JP)

( * ) Notice: Subject to any disclaimer, the term of this patent is extended or adjusted under 35 U.S.C. 154(b) by 78 days.

(21) Appl. No.: 18/026,669

(22) PCT Filed: Sep. 1, 2021

(86) PCT No.: PCT/JP2021/032148
§ 371 (c)(1),
(2) Date: Mar. 16, 2023

(87) PCT Pub. No.: WO2022/064985
PCT Pub. Date: Mar. 31, 2022

(65) Prior Publication Data
US 2023/0400056 A1 Dec. 14, 2023

(30) Foreign Application Priority Data
Sep. 28, 2020 (JP) ................................ 2020-162107

(51) Int. Cl.
*F16C 17/02* (2006.01)
*F16C 33/10* (2006.01)
*H02K 7/08* (2006.01)

(52) U.S. Cl.
CPC .......... *F16C 17/026* (2013.01); *F16C 33/107* (2013.01); *H02K 7/085* (2013.01); *F16C 2360/46* (2013.01); *F16C 2380/26* (2013.01)

(58) Field of Classification Search
CPC .. F16C 17/026; F16C 33/107; F16C 2380/26; F16C 17/107; F16C 2360/46;
(Continued)

(56) References Cited

U.S. PATENT DOCUMENTS

2003/0174917 A1  9/2003  Ikegawa
2006/0133704 A1* 6/2006  Uenosono ........... F16C 33/1085
                                                    384/107
(Continued)

FOREIGN PATENT DOCUMENTS

CN  103415716  11/2013
JP  7-158633    6/1995
(Continued)

OTHER PUBLICATIONS

International Preliminary Report on Patentability and Written Opinion of the International Searching Authority issued Mar. 28, 2023, in International (PCT) Application No. PCT/JP2021/032148, with English translation.
(Continued)

*Primary Examiner* — John Olszewski
*Assistant Examiner* — Aimee Tran Nguyen
(74) *Attorney, Agent, or Firm* — Wenderoth, Lind & Ponack, L.L.P.

(57) ABSTRACT

A fluid dynamic bearing (bearing sleeve 8) includes a first dynamic pressure generating part 11 and a second dynamic pressure generating part 12 that are provided in an inner peripheral surface 8a so as to be spaced apart from each other in an axial direction. The respective dynamic pressure generating parts 11 and 12 have a plurality of dynamic pressure generating grooves 11a, 11b, 12a, and 12b arranged in a herringbone shape and having different tilt directions. The first dynamic pressure generating part 11 has an annular hill part 11c between the axial directions of the plurality of dynamic pressure generating grooves 11a and 11b having different tilt directions. The plurality of dynamic pressure generating grooves 12a and 12b, having different tilt directions, of the second dynamic pressure generating part 12 are continuous in the axial direction.

5 Claims, 6 Drawing Sheets

(58) Field of Classification Search
CPC .. F16C 2370/12; H02K 7/085; H02K 5/1675; H02K 7/086
See application file for complete search history.

(56) References Cited

U.S. PATENT DOCUMENTS

| | | |
|---|---|---|
| 2013/0223773 A1 | 8/2013 | Chung et al. |
| 2013/0293048 A1 | 11/2013 | Oh et al. |
| 2013/0336604 A1 | 12/2013 | Noda et al. |
| 2016/0230769 A1 | 8/2016 | Komatsubara |
| 2017/0254357 A1 | 9/2017 | Komatsubara et al. |

FOREIGN PATENT DOCUMENTS

| | | | |
|---|---|---|---|
| JP | 08-335366 | | 12/1996 |
| JP | 2002-349548 | | 12/2002 |
| JP | 2006-25512 | | 1/2006 |
| JP | 2007-192316 | | 8/2007 |
| JP | 2007-255457 | | 10/2007 |
| JP | 2007-333004 | | 12/2007 |
| JP | 2007333004 A | * | 12/2007 |
| JP | 2015-064019 | | 4/2015 |
| JP | 2015-143576 | | 8/2015 |
| JP | 2016-050648 | | 4/2016 |
| TW | 201335499 | | 9/2013 |
| WO | 2018/012186 | | 1/2018 |

OTHER PUBLICATIONS

International Search Report issued Nov. 2, 2021, in International (PCT) Application No. PCT/JP2021/032148, with English translation.

* cited by examiner

FLUID DYNAMIC BEARING, FLUID DYNAMIC BEARING DEVICE, AND MOTOR

TECHNICAL FIELD

The present invention relates to a fluid dynamic bearing, a fluid dynamic bearing device, and a motor.

BACKGROUND ART

A fluid dynamic bearing device increases the pressure of a lubricating fluid in a bearing clearance formed between a bearing and a shaft by relative rotation between the bearing and the shaft, and supports the shaft in a non-contact manner by this pressure. Since the fluid dynamic bearing devices have characteristics such as high speed rotation, high rotation accuracy, and low noise, they are widely used as bearings for motors such as a spindle motor of a magnetic disk drive device such as an HDD, a polygon scanner motor of a laser beam printer, and a fan motor provided in a PC or the like.

In the inner peripheral surface of the bearing of the fluid dynamic bearing device, a dynamic pressure generating part, such as dynamic pressure generating grooves that actively generate a pressure in the lubricating fluid in the bearing clearance, is often formed (hereinafter, a bearing in which the dynamic pressure generating part is formed on the inner peripheral surface is referred to as a "fluid dynamic bearing"). For example, Patent Literatures 1 to 4 below disclose various specifications of dynamic pressure generating grooves formed in fluid dynamic bearings.

Patent Literature 1 discloses a dynamic pressure generating groove specification in which dynamic pressure generating grooves having a herringbone shape provided at two locations in an axial direction are continuous in the axial direction.

Patent Literature 2 discloses a dynamic pressure generating groove specification in which dynamic pressure generating grooves having a herringbone shape are formed on one side in an axial direction of a bearing surface, and dynamic pressure generating grooves having a cylindrical or spiral shape are formed on the other side in the axial direction of the bearing surface.

Patent Literature 3 discloses a dynamic pressure generating groove specification in which, in order to reduce an amount of wear of a bearing surface, a ratio between a circumferential width of a hill part and a circumferential width of a groove part is defined.

Patent Literature 4 discloses a dynamic pressure generating groove specification in which the widths of dynamic pressure generating grooves are made different between above and below a center line.

CITATION LIST

Patent Literature

Patent Literature 1: JP 2015-64019 A
Patent Literature 2: JP 2007-192316 A
Patent Literature 3: JP 2007-255457 A
Patent Literature 4: JP 2015-143576 A

SUMMARY OF INVENTION

Technical Problems

As a market trend, information equipment such as notebook computers are strongly required to be thinned, and therefore cooling fan motors to be provided in these equipment are also required to be thinned. On the other hand, the functions of the information equipment have recently been enhanced in order to support the fifth generation mobile communication system (5G), and heat generation amounts from the circuits tend to increase more than ever, so that the demand for the cooling performance of the fan motors is further increased. Therefore, when the rotating shaft of the fan motor is supported by a fluid dynamic bearing, the axial dimension of the fluid dynamic bearing is further reduced as the information equipment is thinned. But the size of an impeller increases in order to improve the cooling performance, and therefore a moment load to be applied to the fluid dynamic bearing increases. The suppression of whirling of the shaft by increasing a bearing stiffness (moment stiffness) against the moment load while the fluid dynamic bearing is made compact in the axial direction, as described above, may not be achieved by the dynamic pressure generating grooves as disclosed in Patent Literatures 1 to 4.

In view of the above circumstances, an object of the present invention is to suppress the whirling of a shaft by increasing a bearing stiffness against the moment load without enlarging the axial dimension of a fluid dynamic bearing.

Solutions to Problems

Figure 9:
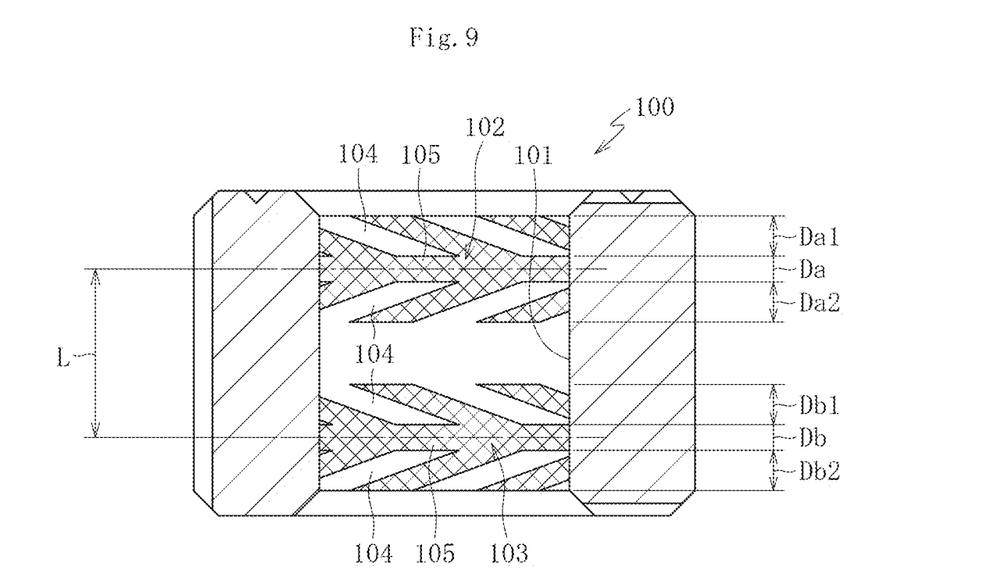
FIG. 9 is a cross-sectional view of a conventional fluid dynamic bearing.

FIG. 9 illustrates a conventional fluid dynamic bearing 100. In an inner peripheral surface 101 of the fluid dynamic bearing 100, a first dynamic pressure generating part 102 and a second dynamic pressure generating part 103 are provided apart from each other in an axial direction. Each of the dynamic pressure generating parts 102 and 103 has a plurality of dynamic pressure generating grooves 104 arranged in a herringbone shape and having different tilt directions.

In order to increase a moment stiffness of such a fluid dynamic bearing 100, it is considered, for example, to increase a bearing span L, that is, an axial distance between maximum pressure parts of both the dynamic pressure generating parts 102 and 103 (in the illustrated example, between axial central portions of both the dynamic pressure generating parts 102 and 103). However, if the bearing span L is increased without changing the shapes of the dynamic pressure generating parts 102 and 103, the axial dimension of the fluid dynamic bearing 100 is enlarged.

Figure 10:
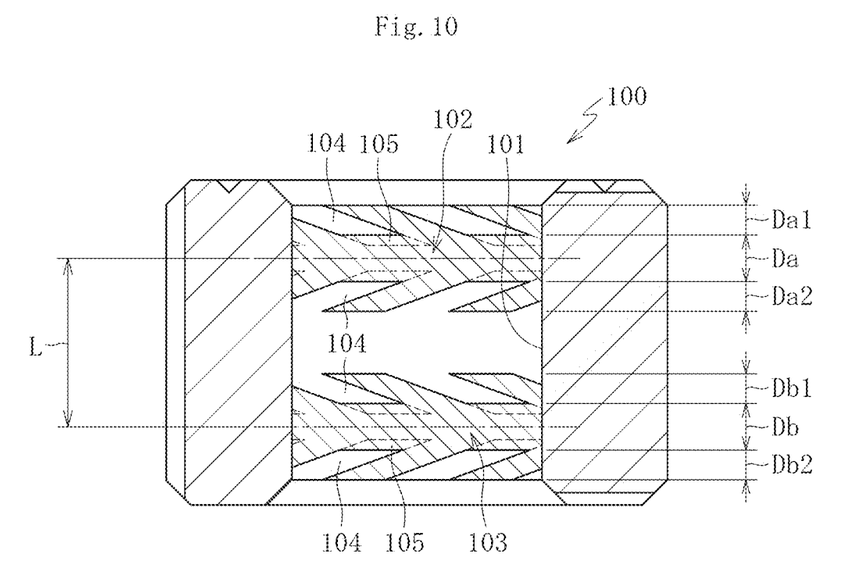
FIG. 10 is a cross-sectional view of a modification of the fluid dynamic bearing in FIG. 9.

When axial widths Da and Db of annular hill parts 105 of the dynamic pressure generating parts 102 and 103 are increased as illustrated, for example, in FIG. 10, a high pressure region is enlarged, and an improvement in the moment stiffness can be expected (in FIG. 10, the shapes of the dynamic pressure generating grooves in FIG. 9 are indicated by dotted lines). However, if the axial widths Da and Db of the annular hill parts 105 are enlarged, axial widths Da1, Da2, Db1, and Db2 of the dynamic pressure generating grooves 104 are reduced by that amounts, and the length of each of the dynamic pressure generating grooves 104 is shortened. Therefore, the amounts of a fluid collected on the annular hill part 105 sides by the dynamic pressure generating grooves 104 decrease, leading to a decrease in the bearing stiffness.

Figure 11:
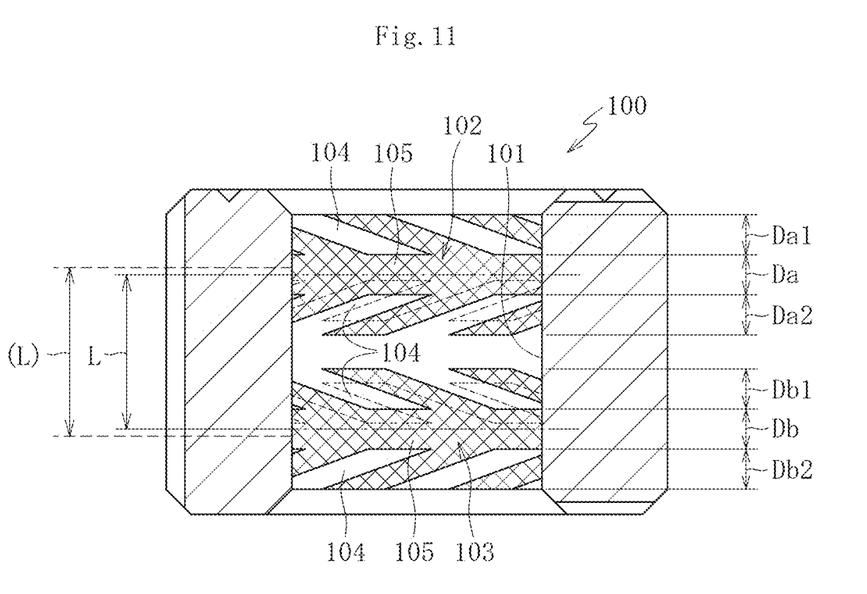
FIG. 11 is a cross-sectional view of another modification of the fluid dynamic bearing in FIG. 9.

In addition, if the axial widths Da and Db of the annular hill parts 105 are enlarged while the axial widths Da1, Da2, Db1, and Db2 of the dynamic pressure generating grooves 104 are maintained, as illustrated in FIG. 11, the bearing span L decreases, leading to a decrease in the moment stiffness (in FIG. 11, the shapes of the dynamic pressure generating grooves in FIG. 9 are indicated by dotted lines, and a bearing span between these dynamic pressure generating grooves is indicated by (L)).

Therefore, the present inventor has focused on the point that a whirling amount of the shaft, occurring when a moment load is applied, differs depending on an axial position, and has reached an idea that a fluid dynamic pressure (bearing stiffness) to be generated by the dynamic pressure generating part is made different depending on an axial position. On the basis of this idea, the present invention provides a fluid dynamic bearing including a first dynamic pressure generating part and a second dynamic pressure generating part that are provided in an inner peripheral surface so as to be spaced apart from each other in an axial direction, in which each of the dynamic pressure generating parts has a plurality of dynamic pressure generating grooves arranged in a herringbone shape and having different tilt directions, the first dynamic pressure generating part includes an annular hill part between the axial directions of the plurality of dynamic pressure generating grooves having different tilt directions, and the plurality of dynamic pressure generating grooves having different tilt directions of the second dynamic pressure generating part are continuous in the axial direction.

In this fluid dynamic bearing, the bearing stiffness of the first dynamic pressure generating part having the annular hill part is higher than the bearing stiffness of the second dynamic pressure generating part having no annular hill part (i.e., the plurality of dynamic pressure generating grooves having different tilt directions are continuous in the axial direction). By providing no annular hill part in the second dynamic pressure generating part, as described above, the axial width of the annular hill part of the first dynamic pressure generating part can be enlarged by that amount. This makes it possible to increase the bearing stiffness of the first dynamic pressure generating part without increasing the axial dimension of the fluid dynamic bearing or reducing the bearing span. By disposing the fluid dynamic bearing such that the first dynamic pressure generating part having high bearing stiffness is disposed at an axial position where the whirling of the shaft is expected to increase, the whirling of the shaft, occurring when a moment load is applied, can be efficiently suppressed.

In the above fluid dynamic bearing, it is preferable that the tilt angle, with respect to the circumferential direction, of the dynamic pressure generating grooves of the first dynamic pressure generating part is made smaller than the tilt angle, with respect to the circumferential direction, of the dynamic pressure generating grooves of the second dynamic pressure generating part. As a result, the bearing stiffness of each of the dynamic pressure generating parts can be maximized.

A fluid dynamic bearing device, including the fluid dynamic bearing, a shaft member inserted into an inner periphery of the fluid dynamic bearing, and a radial bearing part that supports relative rotation of the shaft member by a dynamic pressure action of a lubricating fluid in a radial bearing clearance formed between the inner peripheral surface of the fluid dynamic bearing and an outer peripheral surface of the shaft member, can efficiently suppress the whirling of the shaft, occurring when a moment load is applied, without enlarging the axial dimension.

The fluid dynamic bearing device described above can be incorporated into a motor including a rotor that rotates integrally with the shaft member or the fluid dynamic bearing, and a drive unit that rotationally drives the rotor (e.g., a fan motor in which the rotor has an impeller). In such a motor, the whirling amount of the shaft member is usually maximized at the axial position of the center of gravity of the entire rotation side including the rotor. Therefore, by disposing the first dynamic pressure generating part having high bearing stiffness at an axial position closer to the center of gravity of the entire rotation side including the rotor than the second dynamic pressure generating part is, the whirling of the shaft member, occurring when a moment load is applied, can be efficiently suppressed.

Advantageous Effects of Invention

According to the fluid dynamic bearing of the present invention, it is possible to increase the bearing stiffness against a moment load without enlarging the axial dimension and to suppress the whirling of the shaft, as described above.

DESCRIPTION OF EMBODIMENTS

Hereinafter, embodiments of the present invention will be described with reference to the drawings.

Figure 1:
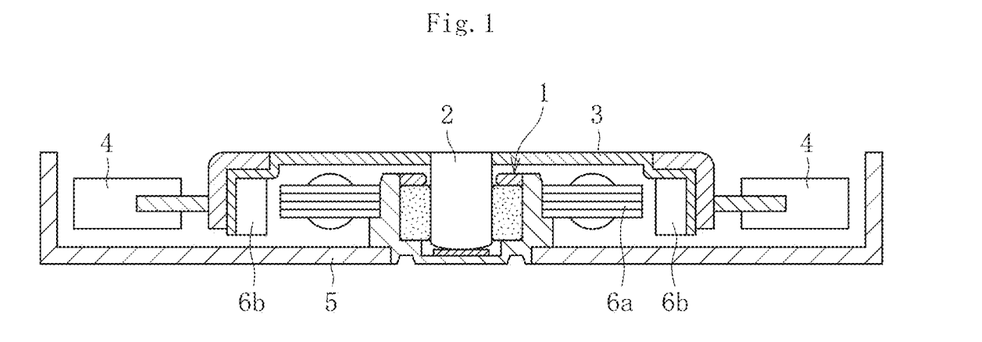
FIG. 1 is a cross-sectional view of a fan motor.

The motor illustrated in FIG. 1 is a cooling fan motor to be incorporated into information equipment, particularly, into mobile information equipment such as a notebook computer. The fan motor includes a fluid dynamic bearing device 1, a rotor 3 mounted on a shaft member 2 of the fluid dynamic bearing device 1, a drive unit including a stator coil 6a and a rotor magnet 6b opposed to each other with a radial gap interposed therebetween, and a casing 5 that houses these components. The stator coil 6a is attached to the outer periphery of the fluid dynamic bearing device 1, and the rotor magnet 6b is attached to the inner periphery of the rotor 3. When the stator coil 6a is powered, the rotor 3 and the shaft member 2 rotate integrally, and an airflow is generated by an impeller 4 provided in the rotor 3.

Figure 2:
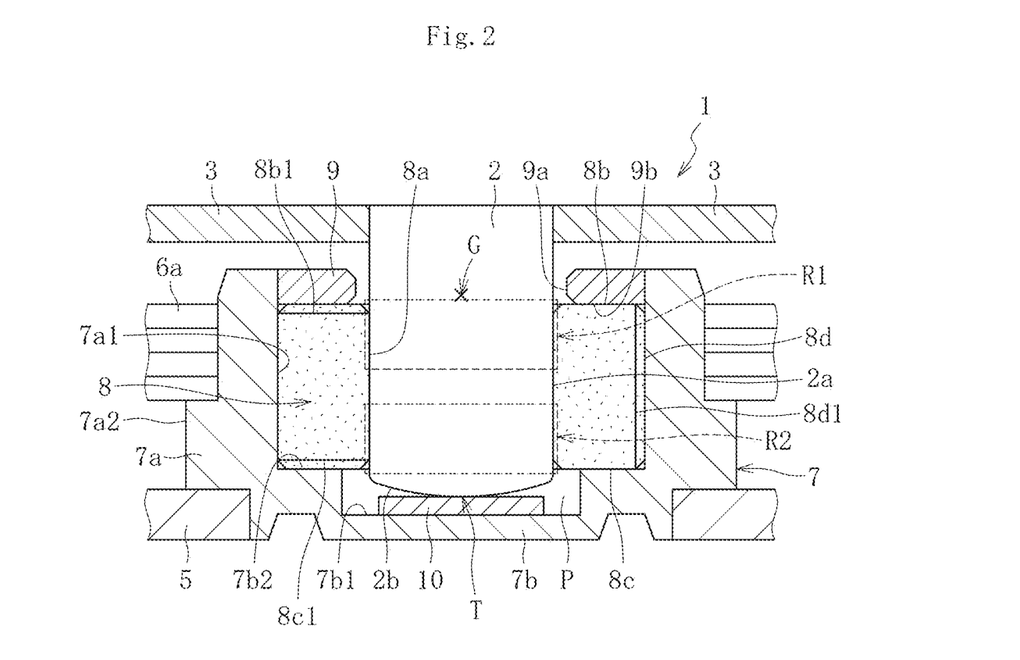
FIG. 2 is a cross-sectional view of a fluid dynamic bearing device incorporated into the spindle motor.

As illustrated in FIG. 2, the fluid dynamic bearing device 1 includes the shaft member 2, a housing 7, a bearing sleeve 8 as the fluid dynamic bearing according to an embodiment of the present invention, a sealing part 9, and a thrust receiver 10. Hereinafter, the opening side of the housing 7 is referred to as an upper side and the bottom portion 7b side of the housing 7 is referred to as a lower side in an axial direction (vertical direction in FIG. 2) for convenience of description, but this is not intended to limit the use mode of the motor.

The shaft member 2 is formed in a columnar shape using a metal material such as stainless steel. The shaft member 2 has a cylindrical outer peripheral surface 2a and a spherical protrusion 2b provided at the lower end.

The housing 7 has a substantially cylindrical side portion 7a and the bottom portion 7b that closes a lower opening of the side portion 7a. In the illustrated example, the side portion 7a and the bottom portion 7b are integrally injection molded using resin. The casing 5 and the stator coil 6a are fixed to an outer peripheral surface 7a2 of the side portion 7a. The bearing sleeve 8 is fixed to an inner peripheral surface 7a1 of the side portion 7a. A shoulder surface 7b2 is provided at the outer diameter end of an upper end surface 7b1 of the bottom portion 7b. The shoulder surface 7b2 is located upper than an inner diameter portion of the upper end surface 7b1 of the bottom portion 7b. A lower end surface 8c of the bearing sleeve 8 is in contact with the shoulder surface 7b2. The thrust receiver 10 made of resin is disposed at a central portion of the upper end surface 7b1 of the bottom portion 7b.

The bearing sleeve 8 has a cylindrical shape, and is fixed to the inner peripheral surface 7a1 of the side portion 7a of the housing 7 by appropriate means such as gap adhesion, press-fitting, or press-fitting adhesion (press-fitting with an adhesive interposed therebetween). In the present embodiment, the bearing sleeve 8 is designed to have an inner diameter of 3 mm or less, an outer diameter of 6 mm or less, and an axial dimension of 6 mm or less. The bearing sleeve 8 is made of, for example, metal, specifically, sintered metal, particularly copper-iron-based sintered metal containing copper and iron as main ingredients.

Figure 3:
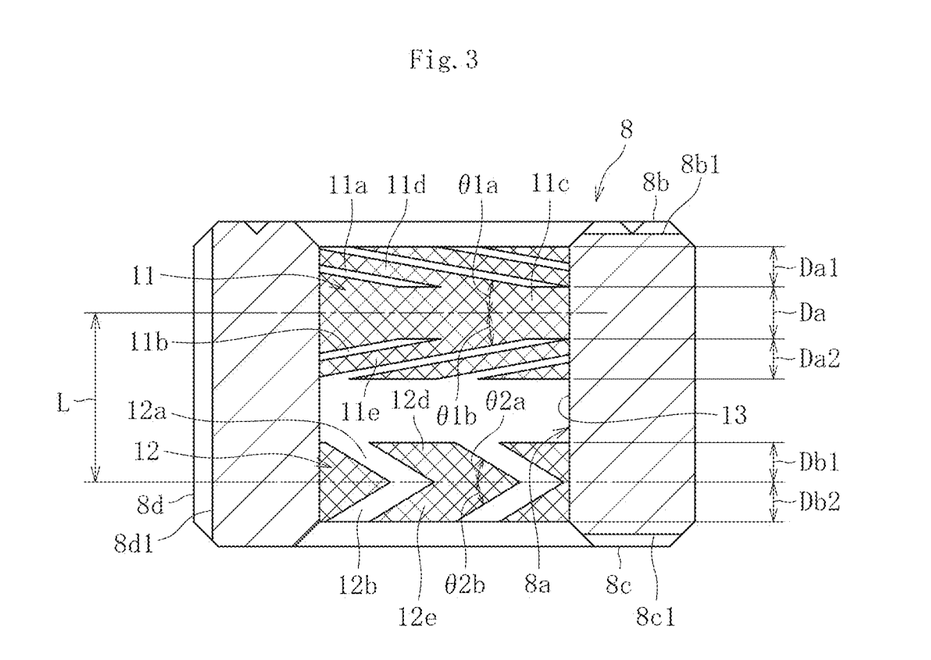
FIG. 3 is a cross-sectional view of a fluid dynamic bearing (bearing sleeve) according to an embodiment of the present invention incorporated into the fluid dynamic bearing device.

As illustrated in FIG. 3, a first dynamic pressure generating part 11 and a second dynamic pressure generating part 12, which are spaced apart from each other in the axial direction, are provided in the inner peripheral surface 8a of the bearing sleeve 8 that serves as a radial bearing surface. The respective dynamic pressure generating parts 11 and 12 have a plurality of dynamic pressure generating grooves 11a, 11b, 12a, and 12b arranged in a herringbone shape. The dynamic pressure generating grooves 11a and 12a on the upper side of the respective dynamic pressure generating parts 11 and 12 have tilt directions different from the tilt directions of the dynamic pressure generating grooves 11b and 12b on the lower side thereof. In the illustrated example, the upper dynamic pressure generating grooves 11a and 12a are tilted in a direction to be displaced to the opposite side (left side in the view) to the rotation direction of the shaft member 2 as going toward one axial direction (upward in the view). The lower dynamic pressure generating grooves 11b and 12b are tilted in a direction to be displaced to the opposite side (left side in the view) to the rotation direction of the shaft member 2 as going toward the other axial direction (downward in the view). Bottom surfaces of the dynamic pressure generating grooves 11a, 11b, 12a, and 12b are provided on the same cylindrical surface. The bottom surface of the lower dynamic pressure generating grooves 11b of the first dynamic pressure generating part 11 and the bottom surface of the upper dynamic pressure generating grooves 12a of the second dynamic pressure generating part 12 are continuous with a cylindrical surface 13 provided between the axial directions of both the dynamic pressure generating parts 11 and 12.

In the illustrated example, tilt angles $\theta 1a$ and $\theta 1b$, with respect to the circumferential direction, of the dynamic pressure generating grooves 11a and 11b of the first dynamic pressure generating part 11 are equal, and axial widths Da1 and Da2 of the dynamic pressure generating grooves 11a and 11b are equal. Tilt angles $\theta 2a$ and $\theta 2b$, with respect to the circumferential direction, of the dynamic pressure generating grooves 12a and 12b of the second dynamic pressure generating part 12 are equal, and axial widths Db1 and Db2 of the dynamic pressure generating grooves 12a and 12b are equal. That is, the first dynamic pressure generating part 11 and the second dynamic pressure generating part 12 have symmetrical shapes in the axial direction, respectively. The tilt angles $\theta 1a$ and $\theta 1b$ of the dynamic pressure generating grooves 11a and 11b of the first dynamic pressure generating part 11 are smaller than the tilt angles $\theta 2a$ and $\theta 2b$ of the dynamic pressure generating grooves 12a and 12b of the second dynamic pressure generating part 12. The axial widths Da1 and Da2 of the dynamic pressure generating grooves 11a and 11b of the first dynamic pressure generating part 11 are equal to the axial widths Db1 and Db2 of the dynamic pressure generating grooves 12a and 12b of the second dynamic pressure generating part 12. The dynamic pressure generating grooves 11a, 11b, 12a, and 12b are disposed at equal intervals in the circumferential direction. The numbers of the dynamic pressure generating grooves 11a, 11b, 12a, and 12b are equal, and in the illustrated example, six dynamic pressure generating grooves are provided for each of them. Note that one or both of the dynamic pressure generating parts 11 and 12 may have asymmetric shapes in the axial direction. In this case, the lubricating fluid in the radial bearing clearance is pushed in the axial direction by the dynamic pressure generating part having asymmetric shapes in the axial direction, and the lubricating fluid is forcibly circulated inside the housing 7.

The first dynamic pressure generating part 11 has an annular hill part 11c between the axial directions of the upper dynamic pressure generating grooves 11a and the lower dynamic pressure generating grooves 11b. The first dynamic pressure generating part 11 has tilted hill parts 11d and 11e between the circumferential directions of the upper dynamic pressure generating grooves 11a and between the circumferential directions of the lower dynamic pressure generating grooves 11b, respectively. The annular hill part 11c and the tilted hill parts 11d and 11e (cross-hatched regions in FIG. 3) are raised from the bottom surfaces of the dynamic pressure generating grooves 11a and 11b to the inner diameter side. Inner diameter surfaces of the annular hill part 11c and the tilted hill parts 11d and 11e are provided on the same cylindrical surface. The annular hill part 11c and all the tilted hill parts 11d and 11 e are continuously provided.

In the second dynamic pressure generating part 12, no annular hill part is provided between the axial directions of the upper dynamic pressure generating grooves 12a and the lower dynamic pressure generating grooves 12b, and the dynamic pressure generating grooves 12a and 12b are continuous in the axial direction. The second dynamic pressure generating part 12 has tilted hill parts 12d and 12e between the circumferential directions of the upper dynamic pressure generating grooves 12a and between the circumferential directions of the lower dynamic pressure generating grooves 12b, respectively. The tilted hill parts 12d and 12e (cross-hatched regions in FIG. 3) are raised from the bottom surfaces of the dynamic pressure generating grooves 12a and 12b to the inner diameter side. Inner diameter surfaces of the tilted hill parts 12d and 12e are provided on the same cylindrical surface. Each of the tilted hill parts 12d and each of the tilted hill parts 12e are continuously provided, and substantially V-shaped hill parts, each formed by one tilted hill part 12d and one tilted hill part 12e, are spaced apart in the circumferential direction.

Since the second dynamic pressure generating part 12 in the bearing sleeve 8 has no annular hill part, as described above, the axial width Da of the annular hill part 11c of the first dynamic pressure generating part 11 can be enlarged by that amount. For example, the axial width Da of the annular hill part 11c can be made larger than the axial widths Da1 and Da2 of the dynamic pressure generating grooves 11a and 11b. In this case, the axial dimension of the bearing sleeve 8 is less likely to enlarge or the bearing span L and the axial dimensions of the dynamic pressure generating grooves 11a, 11b, 12a, and 12b are less likely to decrease than those in a fluid dynamic bearing (see FIG. 9) whose each dynamic pressure generating part is provided with an annular hill part.

A radial groove 8b1 is formed in an upper end surface 8b of the bearing sleeve 8. A radial groove 8c1 is formed in the lower end surface 8c of the bearing sleeve 8. An axial groove 8d1 is formed in an outer peripheral surface 8d of the bearing sleeve 8. The numbers of the radial grooves 8b1 and 8c1 and the number of the axial grooves 8d1 are arbitrary, and for example, the radial grooves 8b1 and 8c1 and the axial grooves 8d1 are formed at three places at equal intervals in the circumferential direction, respectively.

The sealing part 9 is formed in an annular shape by resin or metal, and is fixed to the upper end portion of the inner peripheral surface 7a1 of the side portion 7a of the housing 7 (see FIG. 2). The sealing part 9 is in contact with the upper end surface 8b of the bearing sleeve 8. An inner peripheral surface 9a of the sealing part 9 faces the outer peripheral surface 2a of the shaft member 2 in the radial direction, and a radial clearance is formed therebetween.

The fluid dynamic bearing device 1 is assembled by the following procedure. First, the thrust receiver 10 is fixed to the upper end surface 7b1 of the bottom portion 7b of the housing 7. Then, the bearing sleeve 8, the internal pores of which have been impregnated with lubricating oil in advance, is inserted into the inner periphery of the side portion 7a of the housing 7, and the lower end surface 8c of the bearing sleeve 8 is brought into contact with the shoulder surface 7b2 of the bottom portion 7b. Thereafter, the sealing part 9 is fixed to the upper end of the inner peripheral surface 7a1 of the side portion 7a of the housing 7.

Thereafter, the shaft member 2 is inserted into the inner periphery of the bearing sleeve 8. At this time, air between the bottom portion 7b of the housing 7 and the lower end (protrusion 2b) of the shaft member 2 is discharged to the outside via the radial groove 8c1 of the lower end surface 8c of the bearing sleeve 8, the axial groove 8d1 of the outer peripheral surface 8d, and the radial groove 8b1 of the upper end surface 8b, so that the shaft member 2 can be smoothly inserted. Thereafter, lubricating oil is injected into the space in the housing 7. At least a clearance (radial bearing clearance) between the inner peripheral surface 8a of the bearing sleeve 8 and the outer peripheral surface 2a of the shaft member 2 and a space P between the lower end surface 8c of the bearing sleeve 8 and the upper end surface 7b1 of the bottom portion 7b of the housing 7 are filled with the lubricating oil. The fluid dynamic bearing device 1 of the present embodiment is a so-called partially-filled type fluid dynamic bearing device in which the amount of the lubricating oil is smaller than the volume of the entire space in the housing 7. Thus, the assembly of the fluid dynamic bearing device 1 is completed.

In a state in which the fluid dynamic bearing device 1 is incorporated into the motor illustrated in FIG. 1, a center of gravity G of the entire rotation side including the rotor 3 and the shaft member 2 is provided at the position illustrated in FIG. 2. Of the dynamic pressure generating parts 11 and 12 of the bearing sleeve 8, the first dynamic pressure generating part 11 having the annular hill part 11c is provided at an axial position closer to the center of gravity G than the second dynamic pressure generating part 12 having no annular hill part is. Since the center of gravity G of the rotation side is provided above the axial center of the bearing sleeve 8 in the illustrated example, the bearing sleeve 8 is incorporated into the fluid dynamic bearing device 1 in a direction in which the first dynamic pressure generating part 11 is disposed on the upper side and the second dynamic pressure generating part 12 is disposed on the lower side.

When the shaft member 2 rotates in the fluid dynamic bearing device 1 having the above configuration, the radial bearing clearance is formed between the inner peripheral surface 8a of the bearing sleeve 8 and the outer peripheral surface 2a of the shaft member 2. Then, the dynamic pressure generating parts 11 and 12 formed in the inner peripheral surface 8a of the bearing sleeve 8 generate a dynamic pressure action in the lubricating oil in the radial bearing clearance. In detail, the lubricating oil in the radial bearing clearance is collected on the axial center side of each of the dynamic pressure generating parts 11 and 12 along the dynamic pressure generating grooves 11a, 11b, 12a, and 12b, and the fluid pressure in this portion is increased. As a result, radial bearing parts R1 and R2 that support the shaft member 2 in a non-contact manner in the radial direction are formed. In addition, when the protrusion 2b at the lower end of the shaft member 2 and the thrust receiver 10 slide in contact with each other, a thrust bearing part T that supports the shaft member 2 in the thrust direction is configured.

Since the first dynamic pressure generating part 11 has the annular hill part 11c, the hydraulic pressure (i.e., bearing stiffness) to be generated is higher than in a case where no annular hill part is provided. In addition, since an axial width Da of the annular hill part 11c of the first dynamic pressure generating part 11 can be enlarged by the amount that no annular hill part is provided in the second dynamic pressure generating part 12, the bearing stiffness by the first dynamic pressure generating part 11 can be further increased.

Since the center of gravity G of the entire rotation side including the rotor 3 is disposed above the axial center of the bearing sleeve 8 as illustrated in FIG. 2, the whirling amount of the shaft member 2 tends to be larger on the upper side. The bearing sleeve 8 is incorporated into the motor such that the first dynamic pressure generating part 11 having the annular hill part 11c is disposed on the upper side and the second dynamic pressure generating part 12 having no annular hill part is disposed on the lower side. As a result, the upper portion of the shaft member 2, having a large whirling amount, is supported by the radial bearing part R1 by the first dynamic pressure generating part 11 having relatively high bearing stiffness. On the other hand, the lower portion of the shaft member 2, having a relatively small whirling amount, is supported by the radial bearing part R2 by the second dynamic pressure generating part 12 having relatively low bearing stiffness. As described above, the bearing stiffness of the first dynamic pressure generating part 11 is increased by slightly sacrificing the bearing stiffness by the second dynamic pressure generating part 12, and the first dynamic pressure generating part 11 is configured to support the shaft member 2 at an axial position close to the center of gravity G, whereby whirling of the shaft member 2 due to a moment load can be efficiently suppressed.

The first dynamic pressure generating part 11 having the annular hill part 11c can increase a hydraulic pressure to be generated, that is, bearing stiffness by reducing the tilt angles θ1a and θ1b, with respect to the circumferential direction, of the dynamic pressure generating grooves 11a and 11b as much as possible. On the other hand, if the tilt angles θ2a and θ2b, with respect to the circumferential direction, of the dynamic pressure generating grooves 12a and 12b are made too small in the second dynamic pressure generating part 12 having no annular hill part, a hydraulic pressure to be generated, that is, bearing stiffness decreases. Therefore, it is preferable that the tilt angles θ1a and θ1b, with respect to the circumferential direction, of the dynamic pressure generating grooves 11a and 11b of the first dynamic pressure generating part 11 are made smaller than the tilt angles θ2a and θ2b, with respect to the circumferential direction, of the dynamic pressure generating grooves 12a and 12b of the second dynamic pressure generating part 12. For example, the tilt angles θ1a and θ1b of the dynamic pressure generating grooves 11a and 11b of the first dynamic pressure generating part 11 are set to be smaller than 30°, and the tilt angles θ2a and θ2b of the dynamic pressure generating grooves 12a and 12b of the second dynamic pressure generating part 12 are set to be 30° or more. As a result, the hydraulic pressure to be generated by each of the dynamic pressure generating parts 11 and 12 can be maximized. When the bearing stiffness is sufficient, the tilt angles θ1a and θ1b of the dynamic pressure generating grooves 11a and 11b of the first dynamic pressure generating part 11 may be made larger than or equal to the tilt angles θ2a and θ2b of the dynamic pressure generating grooves 12a and 12b of the second dynamic pressure generating part 12.

The present invention is not limited to the above embodiment. Hereinafter, another embodiment of the present invention will be described, but redundant description of the same points as those in the above embodiment will be omitted.

Figure 4:
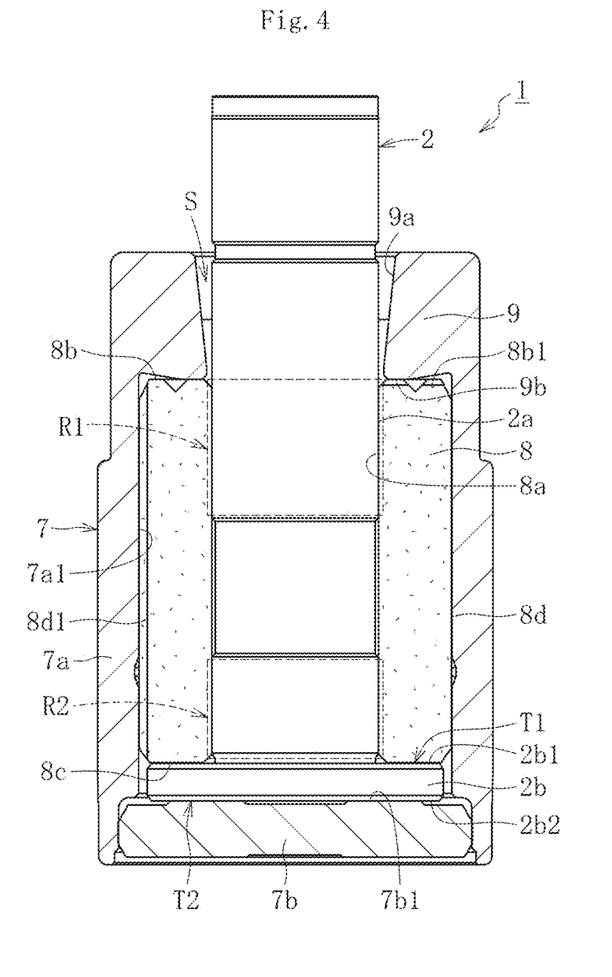
FIG. 4 is a cross-sectional view of a fluid dynamic bearing device according to another embodiment.

The fluid dynamic bearing device 1 may be a fully-filled type. In an embodiment illustrated, for example, in FIG. 4, a tapered surface, the diameter of which further increases as going upward, is provided on the inner peripheral surface 9a of the sealing part 9. A sealing space S having a wedge-shaped cross section, the radial width of which further decreases as going downward, is formed between the tapered surface of the sealing part 9 and the outer peripheral surface of the shaft member 2. An oil surface is held within the sealing space S. The entire space in the housing 7 (space on the inner side from the sealing space S) is filled with lubricating oil.

The fluid dynamic bearing device 1 may have a thrust bearing part that supports the shaft member 2 in the thrust direction by the fluid pressure in a thrust bearing clearance. In the embodiment illustrated, for example, in FIG. 4, a flange part 2b is provided at the lower end of the shaft member 2. On the lower end surface 8c of the bearing sleeve 8, dynamic pressure generating grooves are formed with no radial groove formed. Dynamic pressure generating grooves are formed in the upper end surface 7b1 of the bottom portion 7b of the housing 7. In the illustrated example, the side portion 7a and the bottom portion 7b of the housing 7 are formed as separate components, and the side portion 7a of the housing 7 and the sealing part 9 are formed as one component. When the shaft member 2 rotates, the thrust bearing clearances are formed between an upper end surface 2b1 of the flange part 2b of the shaft member 2 and the lower end surface 8c of the bearing sleeve 8 and between a lower end surface 2b2 of the flange part 2b of the shaft member 2 and the upper end surface 7b1 of the bottom portion 7b of the housing 7, respectively. Then, the pressure of the lubricating fluid in the thrust bearing clearance is increased by the dynamic pressure generating grooves formed in the lower end surface 8c of the bearing sleeve 8 and the upper end surface 7b1 of the bottom portion 7b of the housing 7, whereby thrust bearing parts T1 and T2 that support the shaft member 2 in both the thrust directions are configured.

Figure 5:
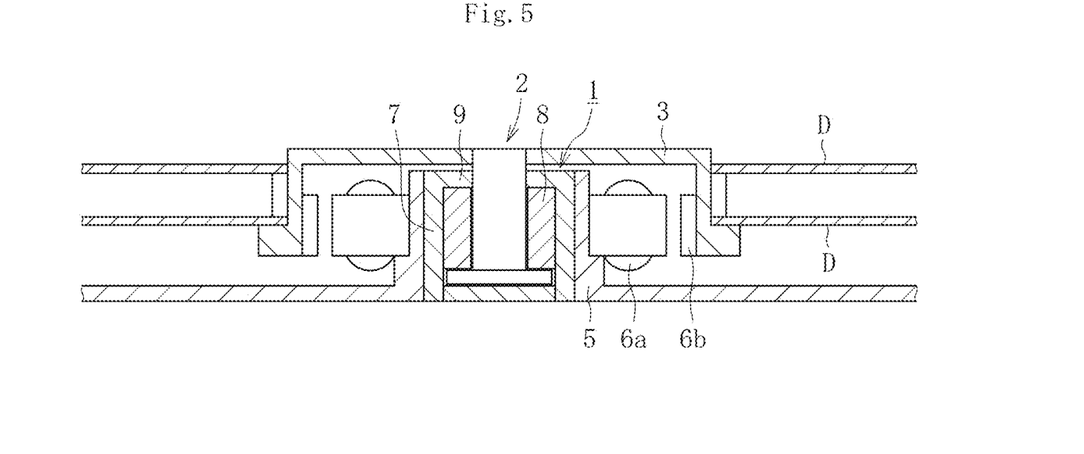
FIG. 5 is a cross-sectional view of a spindle motor of an HDD.

The fluid dynamic bearing device 1 is not limited to the fan motor, and may be incorporated into other motors (e.g., a spindle motor of a disk drive device, a polygon scanner motor, and the like). A spindle motor illustrated, for example, in FIG. 5 is used in a disk drive device of an HDD, and includes the fluid dynamic bearing device 1, the rotor 3 (disk hub) attached to the shaft member 2, the stator coil 6a, and the rotor magnet 6b. The rotor 3 holds a predetermined number (two in the illustrated example) of disks D such as magnetic disks. When the stator coil 6a is powered, the shaft member 2, the rotor 3, and the disk D rotate integrally.

In the above embodiments, a fluid dynamic bearing device of a shaft rotation type, in which the fluid dynamic bearing is on the fixed side and the shaft member is on the rotation side, has been described. However, the fluid dynamic bearing of the present invention may be applied to a fluid dynamic bearing device of a shaft fixed type in which the shaft member is on the fixed side and the fluid dynamic bearing is on the rotation side.

Example 1

In order to confirm the effects of the present invention, the following simulations were performed.

A fluid dynamic bearing model (Example 1), having dynamic pressure generating grooves having a shape illustrated in FIG. 3, and a fluid dynamic bearing model (Comparative Example), having dynamic pressure generating grooves having a shape illustrated in FIG. 9, were created. The dynamic pressure generating groove specifications of Example 1 and Comparative Example are shown in Table 1 below.

TABLE 1

| | | Example 1 | Comparative Example |
|---|---|---|---|
| Groove specification | Number of grooves | Six | Six |
| | Groove depth | 3.0 μm | 3.0 μm |
| | Groove angle Da | 10 deg | 20 deg |
| | Db | 30 deg | 20 deg |
| | Hill-groove ratio | 1 | 1 |
| | Groove width Da 1 | 0.3 mm | 0.3 mm |
| | Da | 0.4 mm | 0.2 mm |
| | Da 2 | 0.3 mm | 0.3 mm |
| | Db 1 | 0.3 mm | 0.3 mm |
| | Db | 0 mm | 0.2 mm |
| | Db 2 | 0.3 mm | 0.3 mm |
| | Bearing span | 1.3 mm | 1.3 mm |

A shaft member model was created in consideration of the weight and the position of the center of gravity of the entire rotation side including a rotor. Then, the shaft member model was inserted into the inner periphery of the fluid dynamic bearing model, and a whirling amount, occurring when the shaft member model was rotated under the following calculation conditions with the axial direction kept horizontal, was calculated. Note that the whirling amount is a maximum displacement amount (misalignment amount), in a direction orthogonal to the axial direction, of the shaft center of the shaft member model when rotated, with respect to the shaft center of the shaft member model when stopped.

Figure 6:
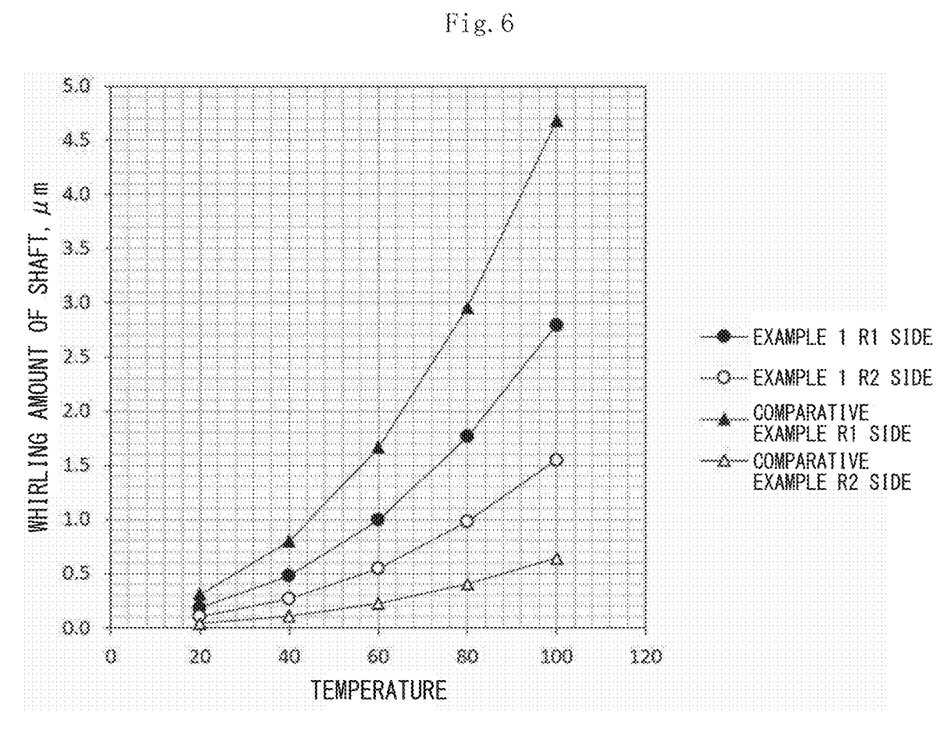
FIG. 6 is a graph showing simulation results of whirling amounts of shafts.

Radial bearing clearance: 5 μm
Rotation speed: 4900 rpm
Lubricating oil: 40° C. kinematic viscosity=42.6 mm2/s, 100° C. kinematic viscosity=7.32 mm2/s As shown in FIG. 6, comparing Example 1 with the comparative example, it can be seen that there is no large difference between the whirling amounts of the shaft at the environmental temperature of 20° C., but the whirling amount of the shaft in the model of the present invention is smaller than that in the model of Comparative Example as the temperature rises (this is considered to be because the viscosity of the lubricating oil further decreases and the bearing stiffness further decreases as the temperature rises). In particular, the whirling amount of the shaft, at 100° C., in the radial bearing part R1 (first dynamic pressure generating part 11) of Comparative Example was 4.7 μm with respect to 5 μm of the radial bearing clearance. In this case, considering the roundness of the outer shape of the shaft and the inner diameter of the bearing, the shaft and the bearing may come into contact with each other, so that there is a high possibility that it cannot be actually used. On the other hand, the whirling amount of the shaft, at 100° C., in the radial bearing part R1 (first dynamic pressure generating part 11) of the model of the present invention was 2.8 μm with respect to 5 μm of the radial bearing clearance, so that it can be actually used. As described above, there is no large difference in the whirling amount of the shaft between Example 1 and Comparative Example at around room temperature at which the viscosity of the lubricating oil is relatively high. However, by adopting the dynamic pressure generating groove specification of Example 1, whirling at high temperature can be suppressed, and the fluid dynamic bearing can be used even in a more severe environment without increasing the axial dimension.

Next, multiple types of fluid dynamic bearing models (Example 2 to 6) having different tilt angles θ1 (=θ1a=θ1b), with respect to the circumferential direction, of the dynamic pressure generating grooves 11a and 11b of the first dynamic pressure generating part 11 having the annular hill part were created, and simulations similar to the above were performed. The dynamic pressure generating groove specifications of Examples 2 to 6 are shown in Table 2 below.

TABLE 2

|  |  |  | Item |  |  |  |
|---|---|---|---|---|---|---|
|  |  | Example 2 | Example 3 | Example 4 | Example 5 | Example 6 |
| Groove specification | Number of grooves | Six | ← | ← | ← | ← |
|  | Groove depth | 3.0 μm | ← | ← | ← | ← |
|  | Groove angle Da | 10 deg | 20 deg | 30 deg | 40 deg | 50 deg |
|  | Db | 20 deg | ← | ← | ← | ← |
|  | Hill-groove ratio | 1 | ← | ← | ← | ← |
|  | Groove width Da 1 | 0.3 mm | ← | ← | ← | ← |
|  | Da | 0.4 mm | ← | ← | ← | ← |
|  | Da 2 | 0.3 mm | ← | ← | ← | ← |
|  | Db 1 | 0.3 mm | ← | ← | ← | ← |
|  | Db | 0 mm | ← | ← | ← | ← |
|  | Db 2 | 0.3 mm | ← | ← | ← | ← |
|  | Bearing span | 1.3 mm | ← | ← | ← | ← |

Figure 7:
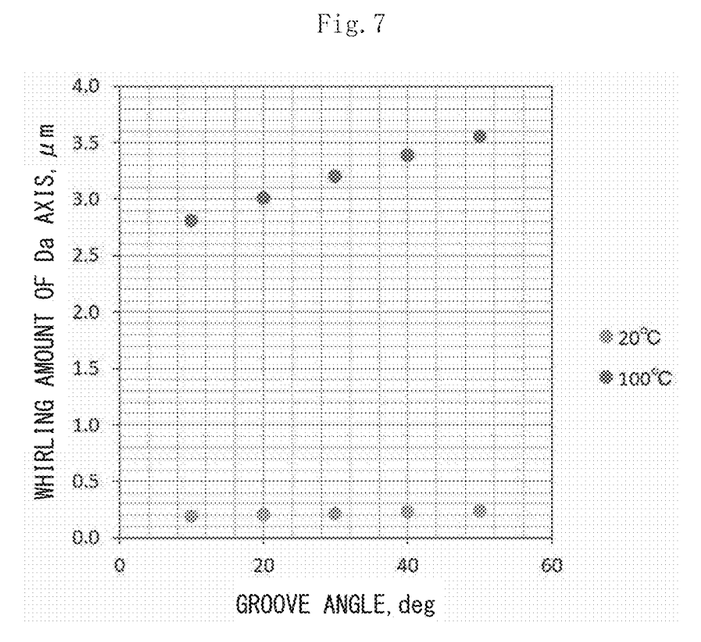
FIG. 7 is a graph showing simulation results of whirling amounts of a shaft.

As illustrated in FIG. 7, the smaller the tilt angles θ1 of the dynamic pressure generating grooves 11a and 11b of the first dynamic pressure generating part 11, the smaller the whirling amount of the shaft. From this result, the tilt angle, with respect to the circumferential direction, of the dynamic pressure generating grooves of the first dynamic pressure generating part is preferably as small as possible. It is preferable that the tilt angle is made, for example, less than 30° and desirably 20° or less. On the other hand, if the tilt angle of the dynamic pressure generating grooves of the first dynamic pressure generating part is too small, there is a risk that a problem may occur in processability. Therefore, it is preferable that the tilt angle is made 1° or more and desirably 5° or more.

Next, fluid dynamic bearing models (Examples 7 to 11) having different tilt angles θ2 (=θ2a=θ2b), with respect to the circumferential direction, of the dynamic pressure generating grooves 12a and 12b of the second dynamic pressure generating part 12 having no annular hill part were created, and simulations similar to the above were performed. The dynamic pressure generating groove specifications of Examples 7 to 11 are shown in Table 3 below.

Figure 8:
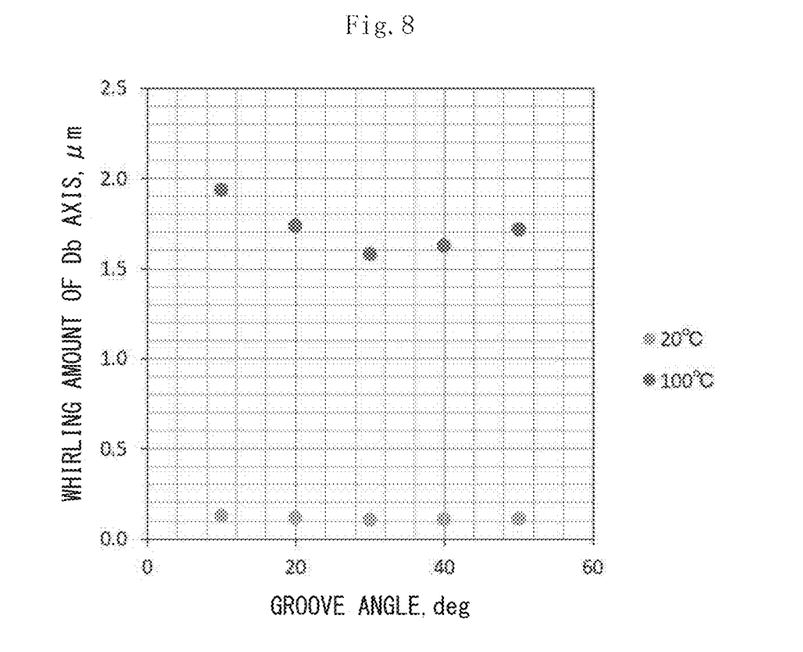
FIG. 8 is a graph showing simulation results of whirling amounts of a shaft.

As shown in FIG. 8, the whirling amount of the shaft was minimized when the tilt angle of the dynamic pressure generating grooves of the second dynamic pressure generating part was 30°, and the whirling amount of the shaft further increased as the tilt angle was away from 30°. In particular, when the tilt angle of the dynamic pressure generating grooves of the second dynamic pressure generating part was made smaller than 30°, the whirling amount of the shaft increased more remarkably than when it was made larger than 30°. From this result, it is preferable that the tilt angle, with respect to the circumferential direction, of the dynamic pressure generating grooves of the first dynamic pressure generating part is made 20° or more and desirably 30° or more. In addition, it is preferable in order to suppress the whirling amount of the shaft that the tilt angle, with respect to the circumferential direction, of the dynamic pressure generating grooves of the second dynamic pressure generating part is made 50° or less and desirably 40° or less.

REFERENCE SIGNS LIST

1 Fluid dynamic bearing device
2 Shaft member
3 Rotor
4 Impeller
7 Housing
8 Bearing sleeve (Fluid dynamic bearing)
9 Sealing part
11 First dynamic pressure generating part
11a, 11b Dynamic pressure generating groove

TABLE 3

|  |  |  | Item |  |  |  |
|---|---|---|---|---|---|---|
|  |  | Example 7 | Example 8 | Example 9 | Example 10 | Example 11 |
| Groove specification | Number of grooves | Six | ← | ← | ← | ← |
|  | Groove depth | 3.0 μm | ← | ← | ← | ← |
|  | Groove angle Da | 20 deg | ← | ← | ← | ← |
|  | Db | 10 deg | 20 deg | 30 deg | 40 deg | 50 deg |
|  | Hill-groove ratio | 1 | ← | ← | ← | ← |
|  | Groove width Da 1 | 0.3 mm | ← | ← | ← | ← |
|  | Da | 0.4 mm | ← | ← | ← | ← |
|  | Da 2 | 0.3 mm | ← | ← | ← | ← |
|  | Db 1 | 0.3 mm | ← | ← | ← | ← |
|  | Db | 0 mm | ← | ← | ← | ← |
|  | Db 2 | 0.3 mm | ← | ← | ← | ← |
|  | Bearing span | 1.3 mm | ← | ← | ← | ← |

11c Annular hill part
11d Tilted hill part
12 Second dynamic pressure generating part
12a, 12b Dynamic pressure generating groove
12d Tilted hill part
13 Cylindrical surface G Center of gravity of entire rotation side
L Bearing span
R1, R2 Radial bearing part
T Thrust bearing part

The invention claimed is:

1. A fluid dynamic bearing comprising a first dynamic pressure generating part and a second dynamic pressure generating part that are provided in an inner peripheral surface so as to be spaced apart from each other in an axial direction, wherein
- each of the first and second dynamic pressure generating parts includes a first part and a second part, the first part having dynamic pressure generating grooves that are tilted in a direction to be displaced to one side in a circumferential direction as going toward one axial direction, and the second part having dynamic pressure generating grooves that are tilted in a direction to be displaced to the one side in the circumferential direction as going toward another axial direction,
- the first dynamic pressure generating part also includes an annular hill part located axially between the first part and second part of the first dynamic pressure generating part,
- the dynamic pressure generating grooves of the first part and the second part of the second dynamic pressure generating part are continuous in the axial direction, and the second dynamic pressure generating part does not include an annular hill part located axially between the first part and second part of the second dynamic pressure generating part,
- a tilt angle, with respect to the circumferential direction, of the dynamic pressure generating grooves of the first part and the second part of the first dynamic pressure generating part is 20 degrees or less, and
- a tilt angle, with respect to the circumferential direction, of the dynamic pressure generating grooves of the first part and the second part of the second dynamic pressure generating part is more than 20 degrees and 40 degrees or less.

2. A fluid dynamic bearing device comprising the fluid dynamic bearing according to claim 1, and a shaft member inserted into an inner periphery of the fluid dynamic bearing, wherein a radial bearing clearance is formed between the inner peripheral surface of the fluid dynamic bearing and an outer peripheral surface of the shaft member.

3. A motor comprising the fluid dynamic bearing device according to claim 2, a rotor that rotates integrally with the shaft member or the fluid dynamic bearing, and a drive unit that rotationally drives the rotor.

4. The motor according to claim 3, wherein the first dynamic pressure generating part is disposed at an axial position closer to a center of gravity of an entire rotation side including the rotor than the second dynamic pressure generating part.

5. The motor according to claim 3, wherein the rotor has an impeller.

* * * * *